United States Patent [19]

Angel et al.

[11] Patent Number: 4,729,668
[45] Date of Patent: Mar. 8, 1988

[54] METHOD AND APPARATUS FOR OPTICAL TEMPERATURE MEASUREMENTS

[75] Inventors: S. Michael Angel; Tomas B. Hirschfeld, both of Livermore, Calif.

[73] Assignee: The United States of America as represented by the United States Department of Energy, Washington, D.C.

[21] Appl. No.: 854,631

[22] Filed: Apr. 22, 1986

[51] Int. Cl.$^4$ ............................................. G01K 11/20
[52] U.S. Cl. .................................. 374/161; 374/127; 374/131
[58] Field of Search ............... 374/131, 161, 159, 121, 374/127; 250/227, 459.1, 461.1, 458.1

[56] References Cited

U.S. PATENT DOCUMENTS

| Re. 31,832 | 2/1985 | Samlilski | 374/131 |
|---|---|---|---|
| 4,215,275 | 7/1980 | Wickersheim | 374/137 |
| 4,278,349 | 7/1981 | Sander | 374/121 |
| 4,459,044 | 7/1984 | Alves | 374/131 |
| 4,542,987 | 9/1985 | Hirschfeld | 374/131 |
| 4,576,486 | 3/1986 | Dils | 374/131 |
| 4,581,530 | 4/1986 | Brogardh et al. | 250/227 |
| 4,592,664 | 6/1986 | Bijlenla | 374/131 |

FOREIGN PATENT DOCUMENTS 2064107 6/1981 United Kingdom ................ 374/131

OTHER PUBLICATIONS

"Recent Advances in Optical Temperature Measurement", Wickersheim and Alves, Industrial Research & Development, Dec. 1979.

Primary Examiner—Allan N. Shoap
Assistant Examiner—Thomas B. Will
Attorney, Agent, or Firm—L. E. Carnahan; Michael B. K. Lee; Judson R. Hightower

[57] ABSTRACT

A method and apparatus are provided for remotely monitoring temperature. Both method and apparatus employ a temperature probe material having an excitation-dependent emission line whose fluorescence intensity varies directly with temperature whenever excited by light having a first wavelength and whose fluorescence intensity varies inversely with temperature whenever excited by light having a second wavelength. Temperature is measured by alternatively illuminating the temperature probe material with light having the first wavelength and light having the second wavelength, monitoring the intensity of the successive emissions of the excitation-dependent emission line, and relating the intensity ratio of successive emissions to temperature.

13 Claims, 3 Drawing Figures

METHOD AND APPARATUS FOR OPTICAL TEMPERATURE MEASUREMENTS

BACKGROUND OF THE INVENTION

The invention relates generally to optical temperature measurement, and more particularly to optical temperature measurement based on the temperature-dependent absorption and fluorescent emission properties of selected materials.

Temperature sensing and control are crucial in a variety of situations arising in medicine, industrial operations, and scientific research. In many cases, temperature measurements must be conducted remotely because the processes or machinery to be monitored is inaccessible or involves hazardous components, such as, high pressures, high radiation levels, high intensity magnetic or electrical fields, corrosive materials, or the like.

In medicine the need for temperature monitoring arises in several contexts. Cardiac output and blood flow rates are measured by the thermal dilution method, wherein a bolus of room temperature solution is injected into a vein and blood temperature changes are monitored by one or more temperature sensing devices located down stream. For accurate measurements, it is desirable to use sensors with frequency responses greater than the major frequency components of the arterial pressure pulse, i.e., faster than about 20–30 Hz. In operations involving artificial hypothermia, such as heart and neurological cases, temperature monitoring is critical. Accurate temperature monitoring is also critical where local hyperthermia is induced as a means of cancer therapy. The differences between normal cells and malignant cells in their sensitivities to thermal killing is often no more than a few tenths of a degree. The presence of metallic sensors greatly complicates temperature control in this mode of therapy as the presence of such sensors can alter the thermal characteristics of the tissue in which they are imbedded. Furthermore, electromagnetic heating of tissues causes special difficulties: electromagnetic interference is induced in the thermometry electronics, excessive and artifactual heating occurs in sensors constructed of resistive material (both thermistors and themocouples), and sensors, especially those contained in highly conductive (and hence reflective) shields, perturb the electromagnetic fields used for heating. Thus, application of metallic, electrically-based temperature sensors presents significant problems: reduced accuracy due to noise and inadequate frequency response, and direct electrical hazard to the patient, especially when more than one sensor is employed.

In industrial process control the most common techniques for temperature measurement utilize thermocouples, thermistors, and resistance thermometers. These devices generate electrical signals which are amplified and then converted into temperature readings or employed in control functions. Frequently, these devices are impractical because the process is inaccessible, too hazardous, or too corrosive for in situ placement of sensors. For example, temperature monitoring of nuclear reactor vessels and coolant systems, underground nuclear waste-disposal sites, chemical dumping sites, working zones of coal-liquification reactors, oil refinery processes, geothermal wells, and like processes, all involve conditions which make the use of standard electrically-based sensors difficult or impractical.

Many of the above-mentioned difficulties with current information-gathering technology can be overcome by using remote, in situ optical probes coupled to a detector by optical waveguides, or fiber optics. Fiber optics are durable, corrosion-resistant, heat-resistant, impervious to electrical or magnetic interference, and are available in very small diameters, which makes them amenable for use with miniature probes.

A large variety of optical temperature sensors have been developed, some of which are amenable for use with fiber optics, Wickersheim and Alves, "Recent Advances in Optical Temperature Measurement," *Industrial Research and Development*, December 1979; Peterson and Vurek, "Fiber-Optic Sensors for Biomedical Applications," *Science*, Vol. 224, pgs. 123–127 (1984). Optically-based sensors generating fluorescent signals modulated by ambient conditions are particularly well suited for use with optical fibers, and several temperature sensors have been developed which are based on the temperature dependent fluorescent properties of selected materials, e.g. Quick et al., U.S. Pat. No. 4,223,226, issued September 1980, entitled "Fiber Optic Temperature Sensor," Samulski, U.S. Pat. No. 4,245,507, issued Jan. 20, 1981, entitled "Temperature Probe," Samulski, U.S. Pat. No. 4,437,772, issued Mar. 20, 1984, entitled "Luminescent Decay Time Techniques for Temperature Measurement;" and Hirschfelo, U.S. Pat. No. 4,542,987, issued Sept. 24, 1985, entitled "Temperature-Sensitive Optrode;" and Haugen and Hirschfeld, "An Ultrafast Remote Sensor for High Pressures and Temperatures," *Energy and Technology Review*, pgs. 78–79 (July 1985). Sensitivity is a major problem with this class of sensors, particularly when used with fiber optics of significant length. That is, it is difficult to obtain a strong enough signal from a fluorescent probe to permit the measurement of small differences in temperature.

Of particular interest are U.S. Pat. Nos. 4,075,493 and 4,215,275 by Wickersheim, issued 21 Feb. 1978 and 29 July 1980, respectively, and both entitled "Optical Temperature Measurement Technique Utilizing Phosphors." Wickersheim discloses a method of measuring temperature by monitoring the intensity ratio of at least two distinct and optically isolatable fluorescent emission lines of selected rare earth-doped compounds. His invention requires at least two photodetection devices, one for each emission line.

Also of interest is Snitzer et al., U.S. Pat. No. 4,302,970, issued 1 Dec. 1981, entitled "Optical Temperature Probe Employing Rare Earth Absorption." Snitzer et al. disclose a device which used the temperature dependent absorption properties of selected rare earths for sensing temperature. The transmission of light through a rare earth-doped material is monitored, and temperature is related to the amount of light transmitted through the material.

SUMMARY OF THE INVENTION

The present invention includes a method and apparatus for optically monitoring temperature. The invention is based on the discovery of a class of materials that possess fluorescent emission lines whose intensity varies directly with temperature over a given temperature range, whenever excited by light having a first wavelength, and whose intensity varies inversely with temperature over substantially the same temperature range whenever excited by light having a second wavelength. Fluorescent emission lines with such a property are referred to herein as excitation-dependent emission lines.

Preferably this class of materials includes, but is not necessarily limited to, solids comprising a host material doped with trivalent rare earth ions.

It is believed that the above property arises in certain atoms and molecules because they possess clusters of closely spaced energy levels, as exemplified by many of the trivalent rare earth ions. Because of the closely spaced energy levels within a cluster, a population of atoms or molecules associated with a cluster possesses a plurality of subpopulations, wherein each subpopulation corresponds to a particular energy level within the cluster. When the material is in thermal equilibrium with its surroundings the relative average sizes of the subpopulations remain constant, but as the surrounding temperature changes the relative number of atoms or molecules within the subpopulations changes. By illuminating such materials with appropriate wavelengths of light, members of each subpopulation can be preferentially excited to an energy level in a higher energy cluster, the decay from which results in fluorescent emissions with substantially identical wavelengths, regardless of the original energy level of the first cluster occupied by the excited atom or molecule.

This property is exploited for measuring temperature by the following method. The material is placed in thermal contact with the substance whose temperature is to be monitored. Next, the material is alternatively illuminated with a first illumination beam having a first wavelength and a second illumination beam having a second wavelength, the first and second wavelengths being chosen, such that the material is caused to fluoresce at an excitation-dependent emission line. The intensity of the excitation-dependent emission line is measured for successive periods of illumination by the first and second illumination beams, and the ratio of successively measured intensities is computed. Finally, the ratio of intensities is related to the temperature of the material.

Apparatus of the invention generally comprise means for carrying out the steps of the method outlined above. Preferably, the apparatus includes a single white light source and an associated filter wheel for alternatively generating the first and second illumination beams. Collectively, this arrangement is one example of an associated light source referred to below. In further preference, light from the first and second illumination beams is delivered to the material by way of a single fiber optic, and the same fiber optic is use to collect fluorescent emissions from the material. Means are provided for separating the first and second illumination beams from the fluorescent emission, collected and transmitted through the fiber optic. The apparatus includes a detector, and standard electronics for computing and analyzing the measured intensity ratios. The invention further includes an optrode which, as the term is used herein, comprises a fiber optic operationally associated with the temperature probe material in accordance with the disclosure below.

The present invention addresses the problem associated with making optically-based temperature measurements, particularly those made over fiber optics and which depend on the generation of fluorescent signals. In accordance with the invention, closely spaced temperatures are determined more readily than was heretofore possible with current technology which is based on the fluorescent properties of a material at a single emission line. This is accomplished by using temperature probes comprising materials that possess excitation-dependent fluorescent emission lines, and by relating to temperature the intensity ratio between successive emissions at such a line undergoing alternative excitation at its associated first and second wavelengths.

The invention also advantageously overcomes the problem of low signal-to-noise ratio in remote measurements made over long distance fiber optics: As temperature changes the change in the intensity ratio of successive emissions of excitation-dependent lines is greater than the changes in the absolute intensity of either emission alone.

DETAILED DESCRIPTION OF THE PREFERRED EMBODIMENT

Figure 1:
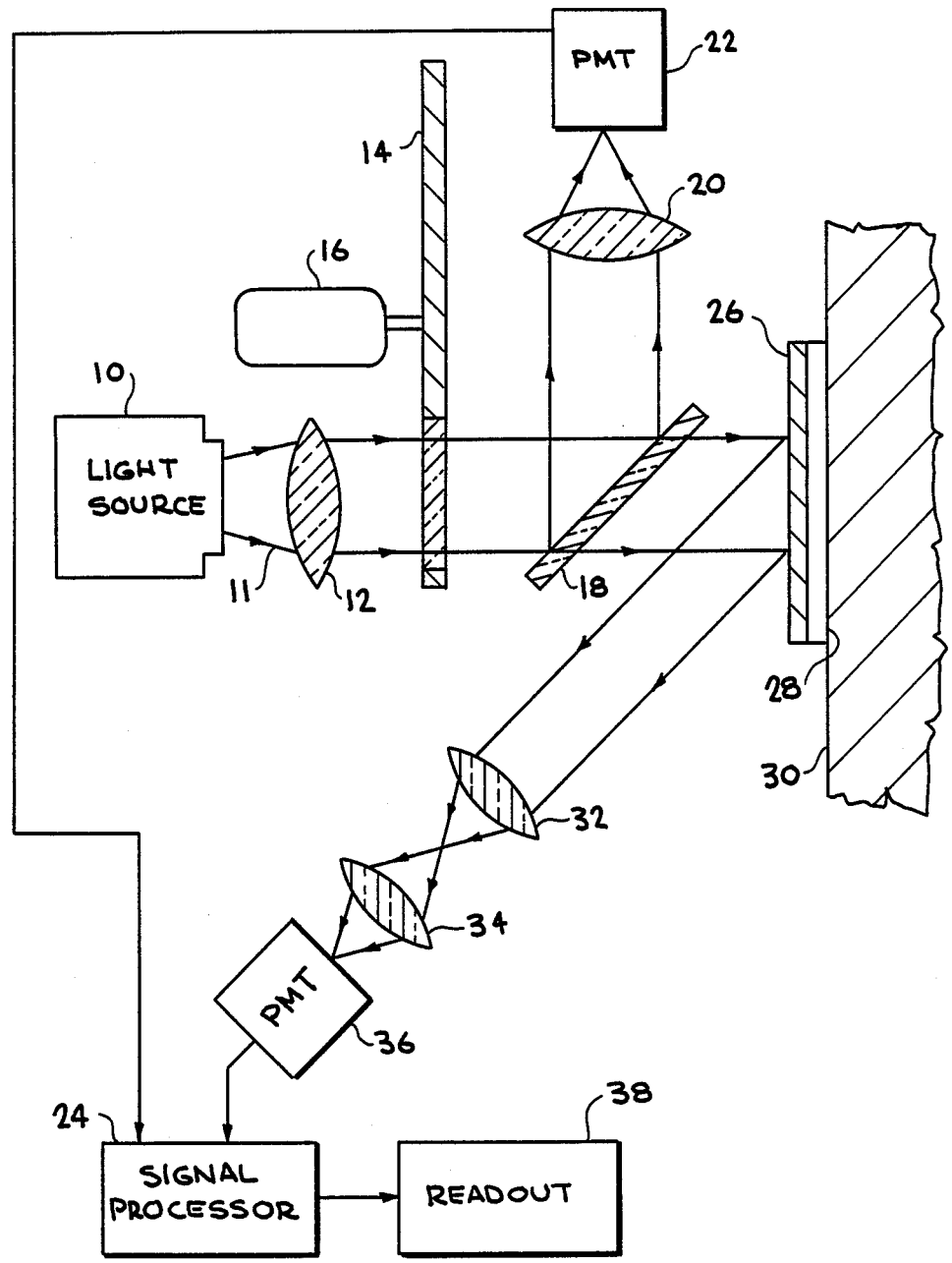
FIG. 1 diagrammatically illustrates a preferred implementation of the invention.

The present invention is directed to making optically based measurements of temperature. It accomplishes this broad object by utilizing temperature probe materials that possess at least one excitation-dependent emission line. Sensitivity of temperature measurements is enhanced by relating to temperature the intensity ratios of sequential emissions of such an emission line undergoing alternative excitation by a first and a second illumination beam.

The preferred temperature probe materials are solid host materials doped with trivalent rare earth ions. Preferably the trivalent rare earth dopant is europium or neodymium; more preferably the dopant is europium at a molar concentration of between about 4–6 percent.

The solid host material can be any solid in which trivalent rare ions can be inserted in appropriate concentrations, and through which optical signals can be transmitted. The preferred choice of host material depends in part on the physical conditions to be encountered in a particular application. The host materials include crystals, such as, calcium fluoride, barium fluoride, sodium chloride, sodium sulfate, strontium sulfate, lead sulfate, lead arsenate, barium arsenate, or the like. The host and dopants in such systems can be combined by coprecipitation followed by calcination. Host materials also include glasses and ceramics. In particular, ceramic and glass-ceramic materials developed for storage of high level radioactive waste are the preferred host materials for high temperature applications in corrosive environments. Some such materials can be prepared from melts in accordance with the disclosures of U.S. Pat. Nos. 4,274,976; 4,314,909; 4,329,248; or 4,383,855, which patents are incorporated by reference. The preferred ceramics can also be prepared by the sol-gel process using standard techniques, e.g., formation of gels by mixing Ti and Zr alcoxides with Ca(NO$_3$)$_2$ and Eu(NO$_3$)$_3$ and hydrolyzing.

By way of example, the following temperature probe material was prepared both from melts and from sol-gels. The material consisted of zirconolite as the host material and trivalent europium at a 5% (molar) concentration as the dopant. The probe material was obtained from melts of stoichiometric mixtures of $ZrO(NO_3)_2\ 2H_2O$, $Ca(NO_3)_2\ 4H_2O$, and $TiO_2$, with small amounts of $Eu(NO_3)_3$ added. The mixtures were fired to at least 1200° C. Sol-gels of the material were prepared from two isopropanol solutions, the first containing $Ca(NO_3)_2$ and $Eu(NO_3)_3$, and the second containing $Ti(OCH_2CH_3)_4$ and $Zr(OCH_2CH_3)_4$. The first solution was cooled to approximately −30° C., then mixed with the second solution. Small amounts of water and $NH_4OH$ were added to the mixture of the first and second solutions to promote gelation. For one embodiment of the invention, the resulting gel was made in capillary tubes. The gels were removed from the capillary tube via extrusion with air pressure to form fibers of so-called alcogels. The fibers were mineralized by first preheating overnight at about 600°-700° C., followed by a final heating overnight at about 1200° C., to give white fibers. Alternatively the sol-gels can be molded in other forms, such as sheets or layers.

Figure 3:
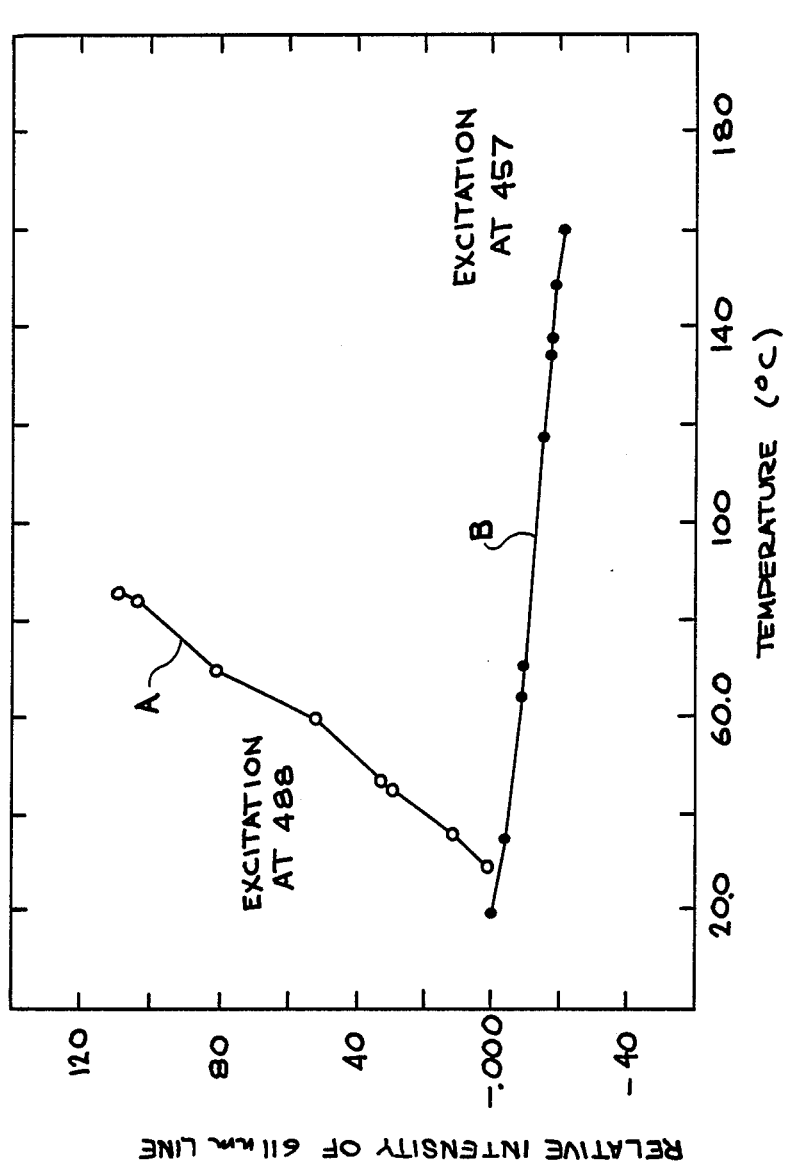
FIG. 3 illustrates the temperature dependent responses of the 611 nm excitation-dependent emission line of europium in zirconolite when excited with a first wavelength of 488 nm and a second wavelength of 457 nm.

FIG. 3 illustrates the temperature dependency of the 611 nm excitation-dependent emission line of europium in zirconolite produced by the sol-gel process just described. The molar concentration of europium was 5 percent. The temperature probe material was illuminated by 488 nm (curve A) and 457 nm (curve B) light over the temperature range of 20°-160° C.

One apparatus for carrying out the method of the invention is illustrated in FIG. 1. White light source 10 emits illumination beam 11 which is collimated by lens 12 and directed through filter wheel 14. Filter wheel 14, driven by motor 16, contains two different kinds of band pass filters arranged in a alternating sequence so that temperature probe material 26 is alternatively illuminated with light having a first wavelength and light having a second wavelength. One filter passes light of the first wavelength of the excitation dependent emission line and the other passes light of the second wavelength of the excitation dependent emission line. Light passed by filter wheel 14 is directed to beam splitter 18; a portion of the light from beam splitter 18 is directed to lens 20 which focuses that portion of the beam onto photomultiplier tube 22. Photomultiplier tube 22 generates a gating signal used by signal processor 24. The gating signal provides a time base for determining when temperature probe material 26 is being illuminated. The portion of the illumination beam not directed to photomultiplier 22 by beam splitter 18 is directed to temperature probe material 26 which is in contact with the substance 30 whose temperature is to be monitored. Preferably, temperature probe material 26 has a reflective backing 28 to redirect light through the temperature probe material 26. Reflective backing 28 is selected so that heat flow between temperature probe material 26 and substance 30 is maximum, i.e., preferably reflective backing 28 is as thin as possible and comprises a good thermal conductor. A portion of the light emitted by temperature probe material 26 is collected and focussed onto photomultiplier tube 36 by lenses 32 and 34. The signal generated by photomultiplier tube 36 is directed to signal processor 24. Signal processor 24 includes standard sample and hold circuitry which allows the ratio of the intensities of the excitation dependent emission line to be computed for successive periods of illumination by the first and second illumination beams. The computed ratio can be read out directly or can be converted to an actual temperature by way of a calibration table. The ratio or temperature is displayed by readout device 38.

Figure 2:
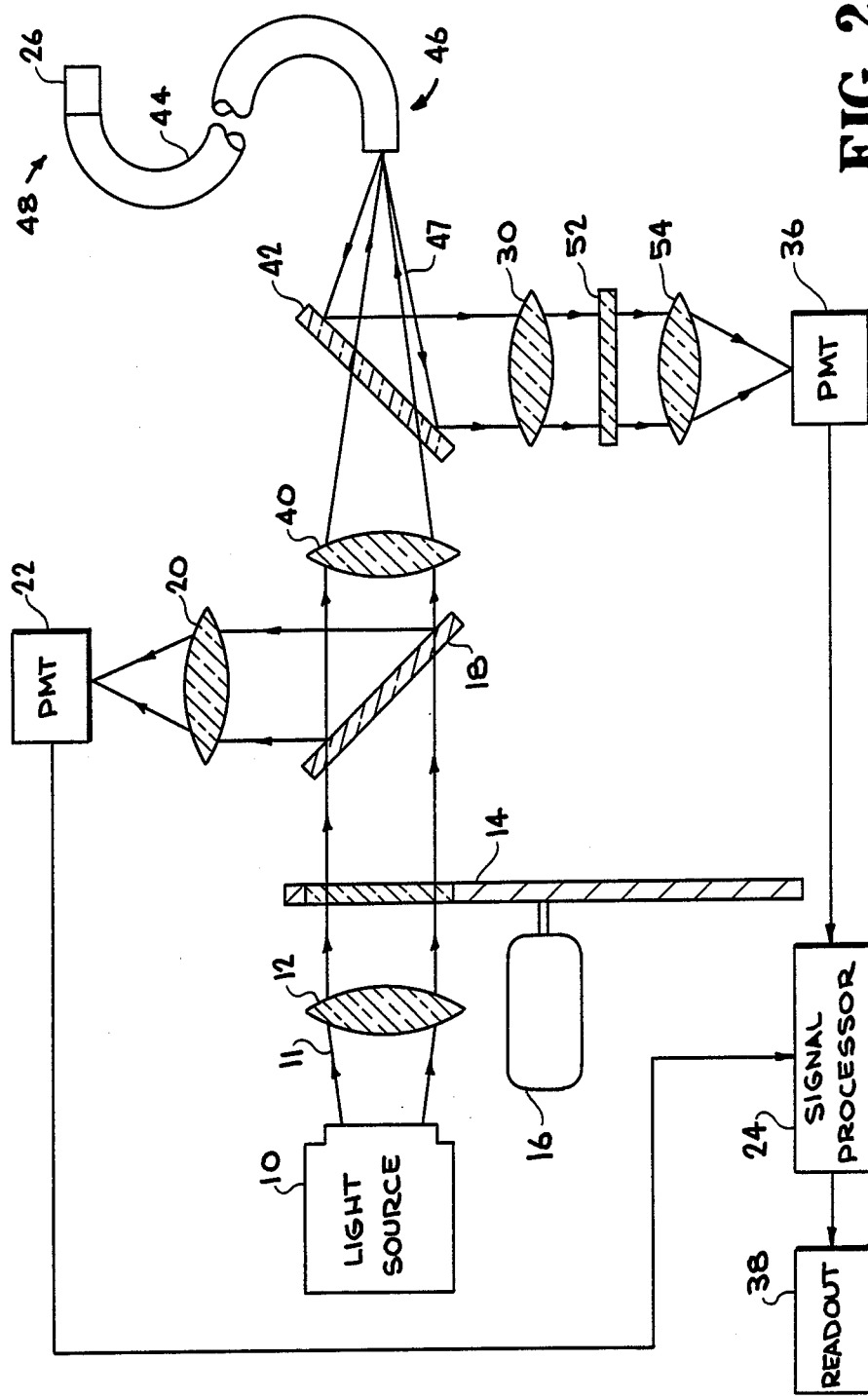
FIG. 2 diagrammatically illustrate a preferred implementation of the invention utilizing a fiber optic.

FIG. 2 illustrates another apparatus for carrying out the method of the invention which employs the temperature probe material attached to a fiber optic. Light source 10 emits illumination beam 11 which is collimated by lens 12 and directed through filter wheel 14. Filter wheel 14 is driven by motor 16 and the filter wheel motor combination is the same as that described for the apparatus of FIG. 1. The beam passed by filter wheel 14 is split into two portions by beam splitter 18. One portion is directed to lens 20 which focuses the beam onto photomultiplier 22. The function of photomultiplier tube 22 is the same as that described for the corresponding element in FIG. 1; namely, it generates a gating signal which is used by signal processor 24 to compute the ratio of successive intensities of fluorescent emissions emitted by temperature probe material 26. The portion of the illumination beam 11 passed by beam splitter 18 is directed to lens 40 which focuses illumination beam 11 onto the first end, 46, of fiber optic 44. Fiber optic 44 transmits illumination beam 11 from its first end 46 to its second end 48. Temperature probe material 26 is attached to second end 48 of fiber optic 44. Light from the illumination beam emanating from second end 48 impinges on temperature probe material 26 causing it to fluoresce. A portion of the fluorescent emissions are collected by second end 48 of fiber optic 44 and transmitted to its first end 46. Fluorescent emissions 47 emanate from first end 46 of fiber optic 44 and are directed by beam splitter 42 to lens 50 which collimates them and directs them through filter 52. Filter 52 is a band pass filter which only passes light having wavelengths substantially the same as that of the excitation dependent emission line of temperature probe material 26. Light passed by filter 52 is directed to lens 54 which focuses the fluorescent emissions onto photomultiplier tube 36. Photomultiplier tube 36 generates a signal which is directed to signal processor 24. Signal processor 24 and readout 38 operate substantially the same as the corresponding components of the apparatus of FIG. 1.

The descriptions of the foregoing embodiments of the invention have been presented for purposes of illustration and description. They are not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for monitoring the temperature of a substance, the method comprising the steps of:
    contacting a temperature probe material with the substance, the temperature probe material having an excitation-dependent emission line whose fluorescence intensity varies directly with temperature whenever excited by light having a first wavelength, and where the excitation-dependent emission line has a fluorescence intensity that varies inversely with temperature whenever excited by light having a second wavelength, which is different from the first wavelength;

alternatively illuminating the temperature probe material with a first illumination beam comprising light of the first wavelength and a second illumination beam comprising light of the second wavelength;

measuring for successive periods of illumination by the first and second illumination beams the fluorescent intensity of the excitation-dependent emission line;

computing a ratio of successively measured intensities; and relating the ratio of successively measured intensities to the temperature of the substance.

2. The method of claim 1 wherein said temperature probe material is comprised of a host material doped with a trivalent rare earth ion.

3. The method of claim 2 wherein said trivalent rare earth ion is europium or neodymium.

4. The method of claim 3 wherein said host material is a ceramic.

5. The method of claim 4 wherein said ceramic is zirconolite or zirconia.

6. The method of claim 5 wherein said trivalent rare earth ion is europium at a molar concentration of between about 4–6 percent.

7. An apparatus for monitoring temperature, the apparatus comprising:

a fiber optic through which light from an associated light source is transmitted from a first end of the fiber optic to a second end of the fiber optic;

a temperature probe material having an excitation-dependent emission line whose fluorescence intensity varies directly with temperature whenever excited by light having a first wavelength, and where the excitation-dependent emission line has a fluorescence intensity that varies inversely with temperature whenever excited by light having a second wavelength which is different from the first wavelength, the temperature probe material being attached to the second end of the fiber optic such that light from the associated light source emanating from the second end of the fiber optic impinges on the temperature probe material causing it to generate a fluorescent signal which is collected and transmitted to the first end of the fiber optic thus becoming a fluorescent signal collected and transmitted by the fiber optic;

means adjacent to the first end of the fiber optic for separating light from the associated light source from the fluorescent signal collected and transmitted by the fiber optic;

detection means adjacent to the separation means for collecting and analyzing the fluorescent signal generated by the temperature probe material and relating the fluorescence intensity from the first wavelength as compared with the fluorescence intensity from the second wavelength to the temperature; and wherein said associated light source alternately generates a first illumination beam having said first wavelength and a second illumination beam having said second wavelength.

8. The apparatus of claim 7 wherein said detection means includes:

means for measuring for successive periods of illumination by said first and second illumination beams the intensity of the excitation-dependent emission line;

means for computing a ratio of successively measured intensities; and means for relating the ratio of successively measured intensities to temperature.

9. The apparatus of claim 8 wherein said temperature probe material is comprised of a host material with a trivalent rare earth ion.

10. The apparatus of claim 9 wherein said trivalent rare earth ion is europium or neodymium.

11. The apparatus of claim 10 wherein said host material is a ceramic.

12. The apparatus of claim 11 wherein said ceramic is zirconolite or zirconia.

13. The apparatus of claim 12 wherein said trivalent rare earth ion is europium at a molar concentration of between about 4–6 percent.

* * * * *

UNITED STATES PATENT AND TRADEMARK OFFICE
CERTIFICATE OF CORRECTION

PATENT NO. : 4,729,668
DATED : March 8, 1988
INVENTOR(S) : S. Michael Angel et al.

It is certified that error appears in the above—identified patent and that said Letters Patent is hereby corrected as shown below:

Column 1, line 4:  Insert:

The U.S. Government has rights to this invention pursuant to Contract No. W-7405-Eng-48 between the U.S. Department of Energy and the University of California, for the operation of Lawrence Livermore National Laboratory.

Signed and Sealed this

Twenty-second Day of August, 1989

Attest:

DONALD J. QUIGG

Attesting Officer

Commissioner of Patents and Trademarks